United States Patent Office 2,881,372
Patented Apr. 7, 1959

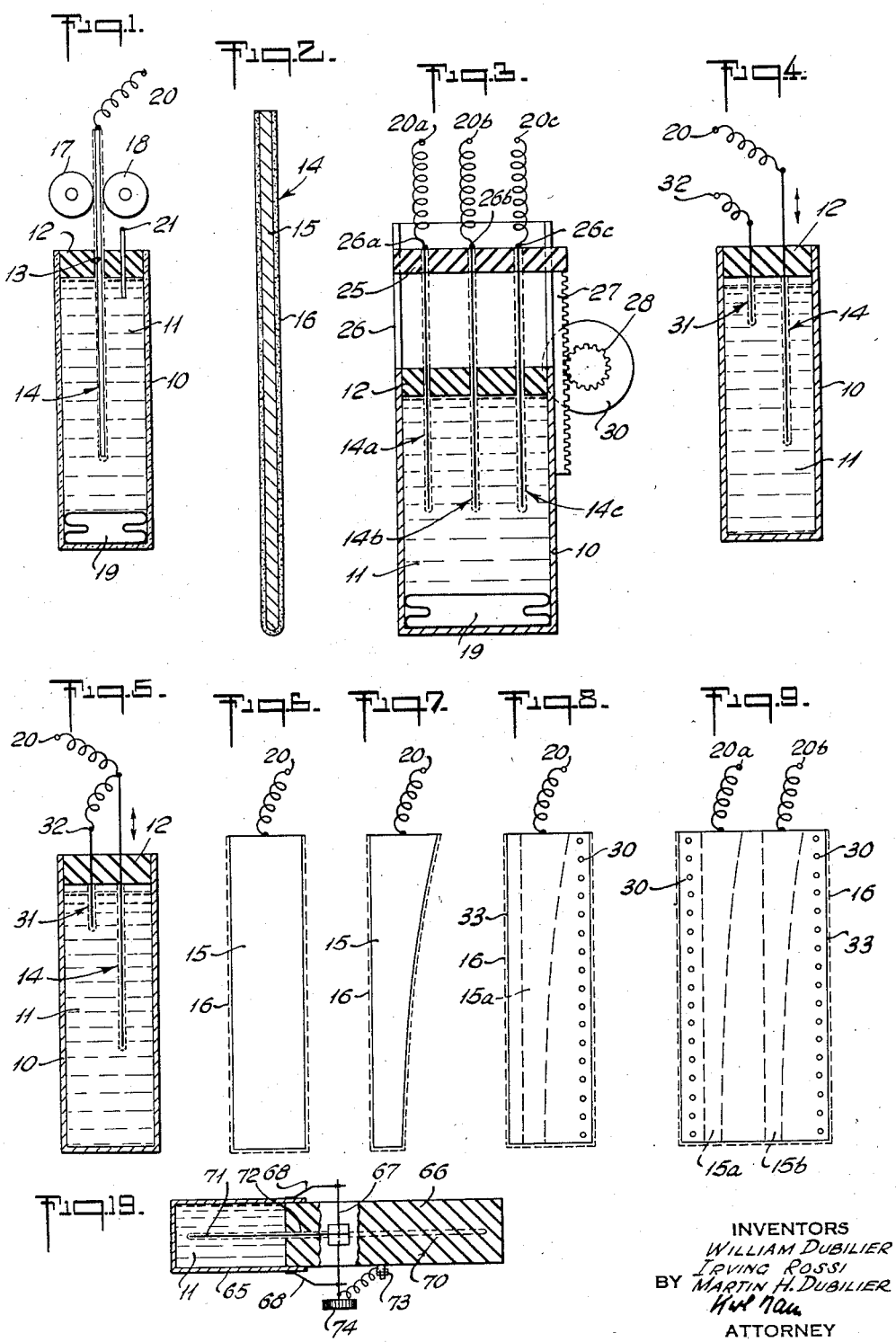

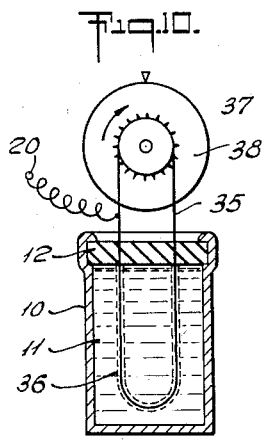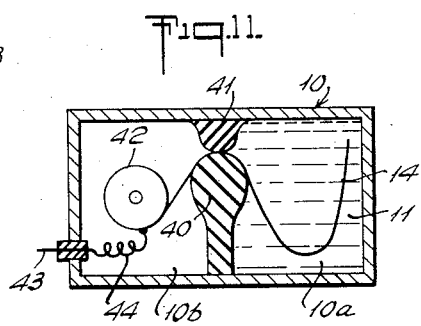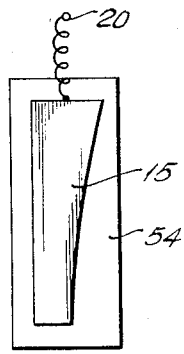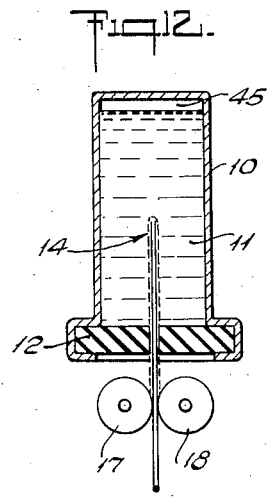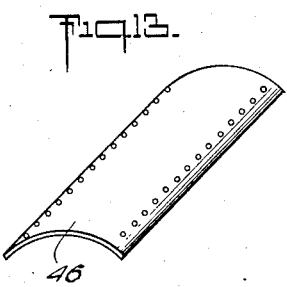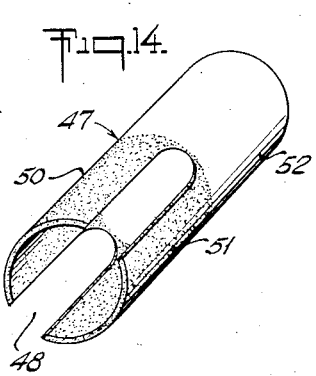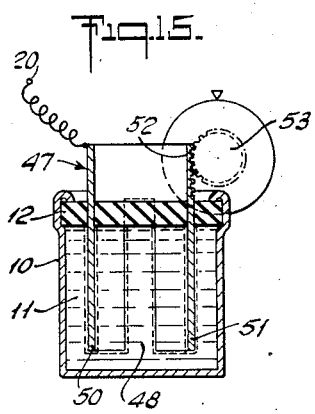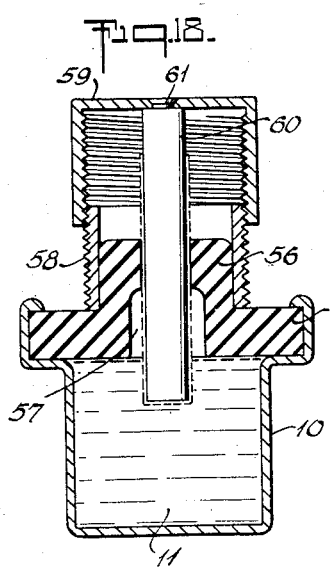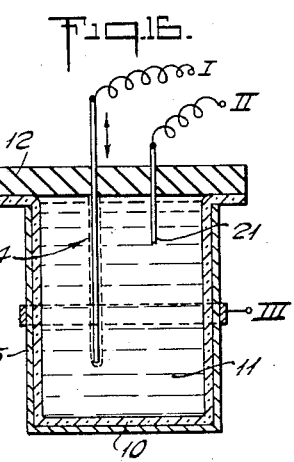

2,881,372

VARIABLE ELECTRICAL CAPACITORS

William Dubilier, New Rochelle, N.Y., Irving Rossi, Morristown, N.J., and Martin H. Dubilier, New Rochelle, N.Y., assignors to Cornell-Dubilier Electric Corporation, South Plainfield, N.J., a corporation of Delaware Application March 15, 1955, Serial No. 494,425

15 Claims. (Cl. 317—249)

The present invention relates to variable electrical capacitors as used to adjust or vary the capacitance of an electrical circuit, such as for tuning radio circuits or for any other use in electrical or electronic devices where an adjustable capacitive reactance is required.

More particularly, though not limitatively, the invention relates to a variable capacitor of novel design capable of being constructed of small size and bulk, as required in miniaturized radio and other electronic equipment.

With the prevailing trend of miniaturization of radio and other electronic equipment, the demands are increasing for a small lightweight and efficient variable capacitor to keep in step with the reduced size and bulk of other miniaturized circuit parts and elements, such as vacuum tubes, transistors, inductors, resistors, etc. Whereas it has been possible to reduce the size of the other parts and elements, while maintaining their electrical values and characteristics, such as by the use of new and improved materials and techniques, difficulties have been encountered in an attempt to miniaturize the conventional rotary variable air type capacitors commonly used for tuning control and other purposes, on account of the proportionate reduction of the electrical capacitance, as the dimensions of the electrodes of the capacitor are reduced to a size conforming with that of the other miniaturized circuit parts and elements.

These difficulties and drawbacks could not be minimized or overcome by the use of a solid or liquid dielectric replacing the air between the electrodes of the conventional capacitor, on account of other defects and drawbacks, such as wear, lack of operating stability and other disadvantages of both an electrical and mechanical nature well known.

Accordingly, an important object of the present invention is the provision of a novel variable capacitor construction, especially suitable for use in miniaturized radio and other electronic equipment, by which the above and related difficulties are substantially overcome.

Among the other objects of the invention is the provision of a variable capacitor which, while of small size and bulk compared with the conventional rotary air type capacitor, enables the attainment of a capacitance and adjusting range equivalent to a conventional variable capacitor; which is both simple in design and construction as well as efficient in operation; which has an electrical capacitance which may be varied between a relatively low minimum and the full or maximum capacitance; and which can be mass produced reliably and economically within the prevailing tolerance ranges and specifications for use as a tuning device in radio circuits or variable reactor in other electrical or electronic equipment.

With the foregoing and other objects in view, as will appear hereafter, the invention involves generally the provision of a variable electrical capacitor comprising a movable metallic electrode layer or element, such as a metallic ribbon, covered or coated on both sides and around its edges with a thin and mechanically resistant layer of insulating or dielectric material, whereby to completely isolate or embed the electrode in the dielectric material. This movable electrode cooperates with a stationary liquid or semi-liquid electrode, for example of mercury, disposed in a container, suitable adjusting means being provided to move said first electrode through a wall portion of said container in close and liquid-tight engagement therewith, in such a manner as to immerse varying lengths of the electrode in the mercury or equivalent conducting liquid, to thereby control the electrical capacitance between said movable and stationary electrodes with said insulating layer constituting the dielectric of the capacitor. By using a dielectric coating upon the movable electrode of suitable mechanical as well as electrical characteristics, such as a film of a synthetic plastic of the type described hereafter, its thickness may be reduced to a minimum to provide a relatively large capacitance in a small space, since the capacitance of the capacitor is inversely proportional to the thickness of the dielectric.

According to a preferred and simplified construction, the container which may consist of metal in contact with the liquid or semi-liquid electrode so as to act as a terminal of the capacitor, is closed by an elastic plug or cover, such as of rubber, a resilient plastic or an equivalent rubber-like material, said cover containing a slot through which is passed the coated or insulated electrode in liquid-tight and close engagement therewith. The electrode may be adjusted by the aid of any suitable drive or control device, such as a pair of friction rollers, a sprocket drive, or any equivalent adjusting device.

In order to maintain stable operating conditions and calibration of the capacitor, the mercury or other liquid substantially fills the space of the container, suitable compensating or expanding means in the form of a bellows or the like being provided to allow of slight expansion and contraction of the liquid due to displacement by the adjustable electrode and/or resulting from ambient temperature variations. By using a thin metal strip as the movable electrode, the container may be of a flat shape and the displacement by the electrode reduced to a negligible minimum.

The complete filling of the space of the container with mercury or an equivalent conducting liquid has the further advantage that the capacitor may be mounted in any desired position and will be insensitive to mechanical shock and/or vibration. Preferably the filling of the space of the container with mercury or equivalent conducting liquid is such that the capacitor may be mounted in any desired position and for all practical purposes will be insensitive to mechanical shock and/or vibration, that is, without materially changing its electrical capacitance. For example, in tuning standard radio receivers, slight variations in capacity are permissible without materially affecting the strength or fidelity of the signal or producing appreciable interference from stations operating upon a neighboring wavelength. For such use the container may be filled with mercury with a minute air space being left which will not materially affect the capacitance when the unit is subjected to vibration or movement in any direction. Where higher constancy or stability is required, which occasions are few as compared to the use for tuning circuits, the unit may be provided with a flexible base, a bellows or any other expansion device forming part of the container wall, to compensate for the expansion and contraction of the mercury or other conducting liquid filling the container. Alternatively, the resilient plug or cover slidably supporting the movable electrode may be designed or consist of a suitable flexible material to compensate for the expansion of the mercury or equivalent conducting liquid.

The above and further objects and novel aspects of the invention will be better understood from the following detailed description of a few practical embodiments thereof, taken in reference to the accompanying drawings, forming part of this specification and wherein:

Fig. 1 is a diagrammatic cross-sectional view of a simple variable capacitor constructed in accordance with the principles of the invention;

Fig. 2 is an enlarged fractional view more clearly showing the construction of the adjustable electrode of the capacitor of Fig. 1;

Fig. 3 is a view similar to Fig. 1 and showing a ganged or multiple capacitor structure according to the invention, suitable for simultaneously tuning or uni-control of a plurality of resonant circuits;

Fig. 4 shows a variable capacitor similar to Fig. 1 combined with a relatively small series capacitor;

Fig. 5 shows a variable capacitor according to Fig. 1 combined with a relatively small parallel capacitor;

Figs. 6 to 9 illustrate various shapes and designs of the adjustable electrode, to obtain special results and effects according to the invention;

Figs. 10 and 11 show further modifications of variable capacitors constructed in accordance with the principles of the invention;

Fig. 12 is a view showing a modification of Fig. 1;

Fig. 13 illustrates an improved construction of the movable electrode;

Fig. 14 shows another movable electrode construction;

Fig. 15 illustrates a capacitor embodying a movable electrode of the type according to Fig. 14;

Fig. 16 is a view similar to Fig. 1 and showing still another modification of the invention;

Fig. 17 shows still another construction of the movable electrode;

Fig. 18 is a section of a variable capacitor according to the invention, especially suitable for use as a trimmer capacitor or other purposes, where only occasional adjustments or resetting of the capacitance are required; and Fig. 19 is a section of another simplified capacitor structure according to the invention using a rotary adjustable electrode.

Like reference numerals identify like parts throughout the different views of the drawing.

Referring more particularly to Fig. 1, the variable capacitor shown comprises a casing 10 of insulating material such as glass, a synthetic plastic or the like, said casing being substantially completely filled with a conducting liquid 11, such as mercury, and having a top closed and sealed by a cover or plug 12 of rubber or an equivalent insulating and resilient material. The mercury fills substantially the entire space of the container, forming a first stationary electrode of the capacitor, the cooperating adjustable electrode 14 being constituted by a thin metal strip or ribbon 15, Fig. 2, coated on all sides including its edges with a thin film or layer 16 of insulating or dielectric material, preferably a synthetic plastic such as tetrafluoroethylene known under the trade name of Teflon, or a polyester of the polyethylene terephthalate type known under the trade name of Mylar, or any other suitable synthetic or other dielectric material capable of being applied to the electrode in the form of a thin mechanically resistant film or layer of small thickness and having a sufficiently high dielectric constant to secure a maximum capacitance and adjusting range of the capacitor in a small space and with a relatively small electrode area, as required for tuning conventional radio circuits.

The movable coated electrode 14 is arranged for translatory or rectilinear movement into and out of the mercury electrode 11 and, for this purpose, is slidably mounted within a narrow slot 13 in the plug 12 to insure both a tight and close seal and to enable a variable immersion of the electrode into and out of the mercury body by the aid of any suitable adjusting drive or control device, such as a pair of friction rollers 17 and 18 engaging the opposite sides of the electrode, one of said rollers being rotated by a calibrated adjusting knob or dial.

Alternatively, the edge or edges of the coated electrode strip 14 may be provided with a series of perforations engaged by a sprocket for moving the electrode 14 in and out of the mercury container. As mentioned above, the mercury constitutes one of the electrodes of the capacitor, electrical connection being made thereto through a suitable contact or terminal lead 21 also passed through and fitted in the plug 12 and having its inner end in contact with the mercury. The cooperating terminal 20 may be connected to the metal ribbon or strip 15 in any suitable manner through a suitable flexible lead or conductor.

The lead or terminal 21 advantageously consists of a metal to prevent amalgamation with the mercury, such as iron, nickel, platinum, or the terminal may be coated with such metals to obtain the same result. Alternatively, the container 10 may consist of a suitable metal or be coated with such metal to prevent amalgamation and to act as a fixed or stationary terminal of the capacitor. In the latter case, the special terminal lead 21 is dispensed with, as shown in the succeeding illustrations of the drawings.

With the electrode 14 consisting of a thin flexible strip or ribbon, such as copper, Phosphor bronze, etc., and coated with a thin insulating or dielectric film of the order of .005" or less consisting of a material of the type mentioned above, it is possible to obtain adequate capacitance values in a small space without causing any appreciable displacement of the mercury or other liquid by the adjustable electrode. If necessary, however, suitable expansion or compensating means may be provided to take care of any displacement and/or expansion and contraction of the mercury as a result of ambient temperature changes or fluctuations.

The insulating or dielectric coating 16 may be applied to the electrode strip 15 in any suitable manner and with the required thickness corresponding to the maximum capacitance and operating potential to which the capacitor is to be subjected in use.

In order to compensate for any displacement or expansion of the mercury 11 or equivalent conducting liquid, the capacitor, in the example shown, is provided with a flexible bellows or expansion member 19 placed at the bottom of the container, to enable expansion and contraction as the electrode 14 is more or less immersed in the liquid or the liquid expands and contracts due to ambient temperature changes or cycles. At the same time, the bellows 19 or equivalent flexible member acts as a balancing or biasing means counteracting the adjustment of the electrode 14, in the manner of a biasing spring, to maintain stable operating conditions and calibration adjustment of the capacitor. In certain cases, the cover 12 may be designed to have a sufficient flexibility to compensate for the expansion and contraction of the mercury or other conducting liquid or semi-liquid material in which case a special bellows or equivalent compensating means may be dispensed with.

The insulating cover 12 is provided with a slot which may be made by a sharp cutting tool, in such a manner that for practical purposes it becomes self-sealing so that when the electrode 14 is moved in the slot there is sufficient closeness and friction to hold the electrode in stable position and to produce a sufficiently close joint, while preventing any possible leakage of the mercury or other liquid forming the stationary electrode. It has been found that by making the movable electrode of the required thickness, or by slightly curving it, Fig. 13, to improve its rigidity, the electrode forms a tight closure preventing leakage and other defects. The thickness of the flexible or semi-flexible cover is such as to provide sufficient friction to retain the electrode in any adjusting position and to prevent accidental sliding through the slot. Alternatively, both the friction wheels 17 and 18 or equivalent driving elements may be operated by a common operating wheel or gear driving one of the elements in one direction and driving the other in the opposite direction, whereby to positively hold the electrode 14 in any adjusting position, independently of its friction with the plug or cover 12.

There is thus provided by the invention a variable capacitor which, for a given capacitance value or adjusting range, may be manufactured with considerably reduced size and bulk, compared with the conventional rotary air type capacitors, and which will enable an efficient control of its electrical capacitance by a relatively simple adjusting movement or control device.

Furthermore, due to the sealed enclosure of the liquid electrode combined, if necessary, with a suitable compensating or expansion device, there is insured an adequate stability and operating safety of the capacitor both mechanically and electrically, not to mention its simplified design and construction rendering it suitable for quantity production and use in miniaturized equipment together with other miniaturized parts and circuit elements. Furthermore, due to the filling of the entire space of the container with the mercury or equivalent conducting liquid or semi-liquid compound, the capacitor may be mounted and operated in any position without affecting its electrical or operating stability or characteristics.

Referring to Fig. 3, there is shown a multiple or gang type capacitor constructed according to the invention comprising three separate capacitor elements mounted in a single container 10 and provided with uni-control means for simultaneously adjusting the capacitance of all the elements, as required for ganged or multiple tuning circuits in radio or other electronic devices. There are provided for this purpose, in the example shown, three adjustable coated or insulated electrodes 14a, 14b and 14c slidably mounted in the rubber plug or disc 12, in the manner described, and having their upper ends secured to an insulating support 25, such as a disc arranged in rectilinear sliding engagement with a cylindrical or other guide 26 secured to or held by the container 10, in the example illustrated. For this purpose, the disc 25 may be provided with a pair of diametrical extensions slidable within slots in the guide 26, one of said extensions terminating in a rack 27 adjoining the outer wall of the guide and casing 10, said rack arranged to cooperate with a pinion 28 provided with a calibrated adjusting knob 30. Rotation of the latter causes the rack 27 and with it the electrodes 14a, 14b and 14c to move in a vertical direction, whereby to simultaneously immerse the electrodes in the mercury or other liquid electrode 11 and to control the electrical capacitance of all the three capacitor elements. In place of three ganged capacitor elements, any other number may be provided for simultaneous or uni-control in the manner shown, to suit any existing conditions and requirements.

The upper ends of the electrodes 14a, 14b and 14c are connected to terminal posts 26a, 26b and 26c mounted upon the support 25, said terminal posts being in turn connected with fixed connecting terminals 20a, 20b and 20c, respectively, of the multiple capacitor through suitable flexible leads, in the manner shown and readily understood. In Fig. 3 the container 20 is shown to consist of a metal can being in contact with the mercury 11 and forming a common electrical terminal of the three elements of the capacitor.

Referring to Fig. 4, there is shown a capacitor construction similar to Fig. 1, comprising a first adjustable coated electrode 14 and an additional relatively small coated electrode 31 also slidably mounted in the flexible cover or disc 12 and connected to a fixed terminal 32. As a result, the capacitance between the terminals 20 and 32 is comprised of a first relatively large and continuously adjustable portion in series with a second relatively small and also adjustable portion. Such a composite capacitor may be used for tracking the tuning adjustment of a resonant circuit, the capacitance provided by the electrode 31 acting as a tracking capacitor in series with the main adjustable capacitor provided by the electrode 14, in a manner well known and understood. According to a simplified construction, the auxiliary capacitor electrode 31 may be in the form of a short wire coated with insulating or dielectric material, similar to the main electrode 14, slight adjustments of the auxiliary capacitance being made by manually adjusting the wire length extending into the mercury or container 10. Alternatively, both capacitors provided by the electrodes 14 and 31 may be used in parallel, with the liquid electrode 11 as a base or common terminal, in a manner readily understood.

Fig. 5 shows an alternative construction of a composite capacitor, similar to Fig. 4, wherein the smaller auxiliary capacitor is connected in parallel with the main adjustable capacitor by connecting the electrodes 14 and 31 by a flexible lead 32, in which case the auxiliary capacitor may serve as a trimmer for calibrating or adjusting a desired zero capacitance of the main or variable capacitor.

In order to secure a desired relation between the capacitance variation as a function of the control or adjusting position, the variable electrode may be suitably shaped such as, for instance, to obtain a linear, square law, logarithmic or any other adjusting relationship, such as illustrated by Figs. 6 to 8. According to Fig. 6, the electrode 15 consists of a rectangular metal strip coated on all sides and around its edges with the thin dielectric layer 16 in the manner described above. With a construction of this type the capacity varies linearly as a function of the adjusting movement or position of the electrode.

In Fig. 7 one of the edges of the electrode 15 is shown curved, to obtain a square law or the like adjusting relationship, in a manner readily understood. Alternatively, both of the edges of the electrode may be curved, to obtain a desired adjusting relationship. If desired, for mechanical or other reasons, to retain the rectangular shape of the electrode, the latter may consist, as shown in Fig. 8, of a rectangular insulating srtip or base plate 33 covered with a suitably shaped electrode such as a metallized layer 15a, the latter being in turn coated or covered with a thin dielectric layer 16 of Mylar, Teflon or the like, capable of forming a hermetic union with the plate 33 so as to completely enclose and seal the electrode or metallized coating 15b.

Alternatively, the electrode strip or ribbon 15 may be placed between two plastic strips or foils of Teflon, Mylar or the like, projecting beyond the edges of the electrode and being united by means of a suitable bonding material with or without heat treatment, to completely isolate and embed the electrode in the dielectric, in a manner understood from the foregoing. The edges of the dielectric strips may then be reinforced, by applying thereto additional layers of insulating material or by any other process, to obtain a composite strip or ribbon of adequate mechanical strength suitable for use as an adjustable electrode in accordance with the invention. This electrode may be provided with perforations 30, Fig. 8, along one or both edges to cooperate with a sprocket wheel for controlling the capacitance, in the manner described hereinabove.

Fig. 9 shows a modified adjustable electrode of this type for a multiple or ganged capacitor, comprising two insulated metal coatings or electrodes 15a and 15b connected to individual terminal posts 20a and 20b, respectively.

Referring to Fig. 10 there is shown an alternative capacitor construction embodying an adjustable electrode in the form of an endless metal band or ribbon 35 having a portion 36 thereof coated with a dielectric or insulating layer and being moved into and out of the mercury 11 by means of a sprocket 37 engaging perforations in the electrode and operated by means of an adjusting knob or dial 38. In this case, the disc or cover is provided with two slots through which is passed the opposite portions of the electrode 15, thus minimizing the possibility of sliding or slipping compared with a single electrode strip shown in the preceding illustrations. This construction has the further advantage over the design according to Fig. 1 of a further reduction in the size of the capacitor. According to the embodiment shown, the top or resilient cover 12 is secured to the container 10 by providing the latter with a seat or rim close to its open end supporting cover 12 and by rolling or spinning the edge of the container inwardly against the outer face of the cover, to provide a mechanically tight and close seal of the container.

According to the construction of Fig. 11, the container 10 is divided into two adjacent parts 10a and 10b by a resilient separating wall of rubber or like material which may be similar to the cover 12 and through which is passed the adjustable or insulating electrode 14 in substantially the same manner as shown by the previous illustrations. According to the modification of Fig. 11, the separating wall comprises a first portion 40 having an enlarged head of round or arcuate cross-section, engaging a separate and similarly shaped portion 41, with the convex surfaces of said wall portions engaging one another and with the insulated adjustable electrode 14 arranged in frictional engagement with both said portions for movement back and forth between the chambers 10a and 10b. The chamber 10a is filled with mercury or an equivalent liquid or semi-liquid conducting material, while the chamber 10b serves as a protective housing for the adjusting mechanism of the capacitor. In the example shown, one end of the electrode 14, in the form of a flexible strip or ribbon, is affixed to a rotatable shaft or cylinder 42 and the adjustment of the capacity is effected by winding and unwinding of the electrode by means of an adjusting knob or the like associated with an adjusting dial or scale. The casing being shown of metal acts as one electrode or terminal of the capacitor, the cooperating terminal 43 being insulatingly passed through the container wall and connected to the shaft or cylinder 42 through a flexible lead 44, to effect a connection with the adjustable electrode, in a manner readily understood.

While the stationary electrode as above described may consist of a conducting liquid, such as mercury or an electrolytic conductor being liquid at normal temperature, a semi-liquid such as a paste-like or jelly-like substance, such as used in electrolytic condensers, or a paste or carrier of semi-liquid consistency and having admixed thereto finely divided conducting particles or material to provide an adequate electrical conductivity, may be used for the purposes of the present invention. Thus, the liquid electrode may consist of an electrolyte comprising a suitable acid, salt or other polarizable or ionizable substance dissolved in water or preferably an alcohol, such as glycerine, ethylene glycol, etc. as an ionizing agent, to provide an adequate electrical conductivity. This electrolyte may be either in liquid form or semi-liquid, by adding to it some material which will combine to form a more or less viscous mass consisting either of a mass of very small crystals or of a jelly-like material entirely in a colloidal form or mixed with some suitable colloid, such as gum or gelatin, having a consistency to allow of easy immersion and adjustment of the movable electrode of the capacitor.

Alternatively, the viscous paste or jelly-like material, with or without an ionizing substance, may have admixed to it finely divided conducting particles, preferably in colloidal form or solution, to provide a semi-liquid conductor or electrode for the capacitor in accordance with the invention. If an electrolyte is used as a stationary conducting electrode, the container if made of metal and the conducting terminal lead to the electrolyte should be of a non-oxidizing and non-film forming material or coated with such a material, to insure intimate and efficient contact with the electrode throughout the life of the capacitor.

Referring to Fig. 12, there is shown a simple capacitor structure, similar to Fig. 1, wherein a slight free space 45 is provided above the mercury or other liquid level, to allow of expansion and contraction due to displacement by the adjustable electrode 14 or caused by ambient temperature changes or cycles. According to this embodiment, the capacitor is advantageously mounted in an inverse position, as shown, to prevent capacitance changes as a result of changes of the liquid level, in that the operative portion of the electrode 14 within the container 10 is always completely surrounded by the mercury or other liquid 11, independently of the variations or fluctuations of the liquid level.

According to a further modification, the electrode 14 may be of a curved shape or cross-section, as shown at 46, Fig. 13, to improve its mechanical stiffness or rigidity. In this case the cathode is passed through a corresponding arcuate slot in the resilient cover 12, in a manner readily understood.

A curved electrode structure of this type results in a further reduction of the size and bulk of the capacitor. A practical example of such a capacitor is shown in Figs. 14 and 15. Referring to the latter, the movable electrode takes the form of a metal tube 47 formed with a longitudinal diametrical slot 48 at one end to provide a pair of opposed arcuate electrode portions 50 and 51 coated with a suitable dielectric or insulating material on both the inside and outside as well as the edges thereof, in the manner according to the invention. This electrode is adjustably mounted in corresponding arcuate slots provided in the resilient cover 12 of the capacitor, to cooperate with the liquid electrode 11, in the manner shown by and understood from Fig. 15. The adjustment or control of the electrode may be effected in any suitable manner, such as by means of a sprocket 53 engaging perforations in the outer non-slotted portion 52 of the electrode cylinder 47, or by means of any other suitable drive or control mechanism readily suggesting itself to those skilled in the art.

According to a further modification shown by Fig. 16, the adjustable capacitor according to the invention may be combined with a fixed capacitor by using an insulating container 10 coated or otherwise provided upon its outside surface with a further electrode 55. There is provided in this manner a variable capacitor by the insulated adjustable electrode 14 cooperating with the liquid electrode 11, in the manner described, and a fixed capacitor comprising the liquid 11 as one electrode and the coating 55 as the cooperating electrode with the container 10 acting as the dielectric of the capacitor. By using a container of suitable material and reduced thickness, a sufficient fixed or constant capacitance may be obtained in this manner.

With the terminal for the variable electrode 14 being designated as I, the terminal connected with the mercury or liquid 10 being designated as II, and the terminal of the outer electrode 55 upon the container designated as terminal III, the following combinations of fixed and variable capacitors may be obtained: A single variable capacitance between terminals I—II; a single fixed capacitance between terminals II—III; a fixed and variable capacitance in series between terminals I—III; and a fixed and variable capacitance in parallel between terminals I and III connected to form a combined first terminal and terminal II acting as the cooperating second terminal of the shunt circuit.

As heretofore pointed out, the insulated adjustable electrode 14 may be formed of a metal strip or sheet 15 having deposited thereon by any suitable process a thin coating or layer 16 of dielectric material, as shown in Fig. 2. According to an alternative method, the insulated electrode may be constructed by placing a metal sheet or foil 15 between two sheets 54 of dielectric material of the same or different thickness and projecting beyond the edges of the sheet 15, as shown in Fig. 17, and bonding the projecting portions by heat, gluing, pasting, etc. to firmly embed and seal the electrode in the dielectric material. If the projecting portions of the dielectric do not have the required stiffness or rigidity, they may be reinforced by the application of an additional layer or layers of insulating material, either solid or liquid and becoming solid upon heating or cooling, to insure adequate mechanical strength of the electrode structure.

Furthermore, the electrode 15 may be in the form of a metallized coating applied to the inside of one or both dielectric sheets 54, with or without marginal reinforcement of the sheets, as may be required.

Referring to Fig. 18 there is shown, on an enlarged scale, an adjustable capacitor constructed in accordance with the invention of relatively small capacitance, such as for use as a trimmer capacitor or for similar purposes. In the example shown, the rubber or like cover 12 is provided with a central raised portion or projection 56 to leave a free space 57 through which is passed a preferably cylindrical coated electrode 60, such as a small length of wire in tight but readily adjustable engagement with a perforation in the projection 56, in the manner substantially as shown in the drawing. The outside of the projection 56 has applied thereto, such as by a resilient or press fit, an outwardly threaded sleeve 58, preferably consisting of metal and cooperating with an inwardly threaded metal cap 59 to which is secured the outer end of the electrode 60. As a result, rotation of the cap 59, such as by means of a screwdriver engaging the slot 61, will result in a screwing of the cap 59 upon the sleeve 58 and, in turn, the immersion of the electrode 60 in the mercury or other liquid 11, to obtain a desired electrical capacitance, in a manner similar to and understood from the foregoing. If the sleeve 58 and cap 59 are of metal, the sleeve 58 constitutes one of the terminals, the metal container or can 10 providing the cooperating terminal of the capacitor.

Referring to Fig. 19, there is shown a rotary type of variable capacitor constructed in accordance with the invention which, aside from compactness and other obvious advantages, has the advantage of a constant liquid displacement independent of the position of the adjustable electrode. The capacitor is shown in horizontal position, it being understood that it may be mounted and operated in any other position such as vertically to suit existing conditions and requirements.

The capacitor of Fig. 19 comprises a metal container 65 closed by a rubber or the like member 66 which, in the example shown, projects to a substantial distance beyond the container and serves both as a support and housing for the rotatable electrode 71 embedded and sealed in a disc 70 of dielectric material. Said disc is rotatably mounted about an axis or shaft 67 passing through the member 70 and suitably supported, such as by a pair of bearings 68 secured to the casing 65 or in any other suitable manner.

The electrode 71 which may be in the form of a metal sheet or a metallized coating, in the manner described, extends over about one-half the area of the dielectric disc 70 and may have a semi-circular or other contour or shape to obtain a desired adjusting law of the capacitor. The left half of the disc 70 from the shaft 67, in the position shown, passes through a narrow slot 73 in the member 70 to insure a tight and close joint, in a manner similar to the strip-like electrode mounting of the previous illustrations, while the slot in the right part of the member 70 may be of a greater width to reduce friction. While the rotatable electrode 70, 71 in this manner is completely enclosed in and protected by the member 70, the latter may be in the form of a simple plug or cover with one-half of the electrode projecting from the casing, similar to the previously described embodiments.

In the example illustrated, the container 65 forms one of the capacitor terminals, the cooperating terminal being advantageously provided by directly connecting the electrode 71 to the shaft 67, provided the supports or bearings 68 are insulated from the container 65. The shaft 67 is connected to a terminal post 73 through a flexible lead for making connection with other parts of the circuit in which the capacitor is to be used. Shaft 67 is further shown provided with an adjusting knob 74 which may cooperate with a calibrated dial, in a manner well known. An advantage of a capacitor construction of this type is the fact that adjustment of the capacity causes no displacement of the liquid 11, since the immersed portion of the disc 70 is of fixed shape or size, irrespective of the adjusting position, in a manner readily understood. If necessary, additional expansion means may be provided to compensate for the expansion and contraction of the liquid electrode 11 due to temperature and other influences, as previously described.

In the foregoing the invention has been described with reference to a few specific illustrative devices. It will be obvious, however, that variations and modifications, as well as the substitution of known parts and elements for those shown, may be made without departing from the broader scope and spirit of the invention as set forth by the appended claims. The specification and drawing are accordingly to be regarded in an illustrative rather than in a limiting sense.

We claim:

1. A variable electrical capacitor comprising a closed container, a movable capacitor electrode having at least a portion coated on all sides by a layer of dielectric material, adjusting means to move said electrode through a yielding wall portion of said container in close engagement therewith, and a body of conducting material filling substantially the entire inside space of said container, to form a cooperating capacitor electrode, and having a consistency to allow of variable areas of the coated portion of said movable electrode to be immersed therein by said adjusting means, thereby to vary the electric capacitance between said electrodes.

2. A variable electrical capacitor comprising a closed container having a wall portion of resilient material, a movable capacitor electrode having at least a portion coated on all sides by a layer of dielectric material, adjusting means to move said electrode into and out of said container through an opening and in close engagement with said wall portion, and a body of conducting material filling substantially the entire inside space of said container, to form a cooperating capacitor electrode, and having a consistency to allow of variable areas of the coated portion of said first electrode to be immersed therein by said adjusting means, thereby to vary the electric capacitance between said electrodes.

3. A variable capacitor as claimed in claim 2, including flexible compensating means associated with said container, to allow of displacement of said conducting body by said electrode.

4. A variable electrical capacitor comprising a closed metallic container having a wall portion of resilient insulating material, a strip-like movable capacitor electrode layer having at least a portion coated on all sides by a thin dielectric layer, adjusting means to move said electrode into and out of said container through a slot in and in engagement with said wall portion, a body of conducting material in contact with the inside wall of and substantially filling the entire space enclosed by said container, to form a cooperating capacitor electrode, said conducting material having a consistency to allow variable areas of said coated portion of said first electrode to be immersed therein by said adjusting means, thereby to vary the electric capacitance between said electrodes.

5. A variable electrical capacitor comprising a closed insulating container having a wall portion of resilient material, a strip-like movable capacitor electrode constituted by a metallic layer having at least a portion coated on all sides by a layer of dielectric material, adjusting means to move said electrode into and out of said container through a slot in and in close engagement with said wall portion, a body of mercury substantially filling the entire inside space of said container, to form a cooperating capacitor electrode and to allow variable areas of said coated portion of said first electrode to be immersed therein by said adjusting means, thereby to vary the electric capacitance between said electrodes, and terminal means in contact with said mercury body and passing from the inside to the outside of said container.

6. A variable electrical capacitor comprising a closed metal container having a resilient wall portion of insulating material, a strip-like movable capacitor electrode constituted by a metallic layer having at least a portion coated on all sides by a layer of dielectric material, adjusting means to move said electrode into and out of said container through a slot in and in close engagement with said wall portion, a body of mercury substantially filling the entire inside space of said container to form a cooperating capacitor electrode and to allow variable areas of the coated portion of said first electrode to be immersed therein by said adjusting means, thereby to vary the electric capacitance between said electrodes.

7. A variable electrical capacitor comprising a closed container having an opening, a closure member of resilient material hermetically closing said opening, a strip-like movable electrode constituted by a metallic layer having at least a portion coated on all sides by a layer of dielectric material, adjusting means to move said electrode into and out of said container through and in close engagement with a slot in said closure member, and a body of conducting material substantially filling the entire inside space of said container to form a cooperating capacitor electrode and having a consistency to allow variable areas of the coated portion of said first electrode to be immersed therein by said adjusting means, thereby to vary the electric capacitance between said electrodes.

8. A variable electrical capacitor comprising a closed metal container having an opening, a rubber closure member hermetically sealing said opening, a first movable electrode constituted by a metallic layer having at least a portion coated on all sides by a layer of dielectric material, adjusting means to move said electrode into and out of said container through an opening and in close engagement with said closure member, and a body of mercury filling substantially the entire inside space of said container, to form a cooperating capacitor electrode and to allow variable areas of the coated portion of said first electrode to be immersed therein by said adjusting means, thereby to vary the electric capacitance between said electrodes.

9. A variable electrical capacitor comprising a closed container having a wall portion of resilient material, a strip-like movable capacitor electrode constituted by a metallic layer having at least a portion coated on all sides by a layer of dielectric material, adjusting means to move said electrode into and out of said container through a slot in and in hermetic engagement with said wall portion, and a body of conducting material substantially filling the entire inside space of said container, to form a cooperating capacitor electrode having a consistency to allow variable areas of the coated portion of said first electrode to be immersed therein by said adjusting means, thereby to vary the electric capacitance between said electrodes.

10. In a capacitor as claimed in claim 9, in which said metallic layer has a varying width to effect a desired capacitance variation of said capacitor as a function of the adjusting position of said movable electrode.

11. In a capacitor as claimed in claim 9, in which said movable electrode consists of a flexible metal strip having at least part thereof coated and sealed on all sides with a layer of plastic dielectric material.

12. In a capacitor as claimed in claim 9, in which the movable electrode consists of a flexible metal strip hermetically bonded between a pair of plastic dielectric layers.

13. In a capacitor as claimed in claim 9, in which said movable electrode consists of an endless metal band having a portion thereof coated and sealed on all sides with a layer of dielectric material and passing through adjacent slots in the resilient wall portion of said container.

14. In a capacitor as claimed in claim 9, in which said movable electrode consists of an arcuately bent metal strip having a portion thereof coated on all sides with a layer of dielectric material and passed through an arcuate slot in the resilient wall portion of said container.

15. A variable electrical capacitor comprising a sealed container having its entire inside space filled with a conducting liquid, to provide a first capacitor electrode, a second cooperating electrode coated on all sides with a dielectric layer, and means for adjustably passing said second electrode through a yielding wall portion of said container in hermetically sealed engagement therewith, whereby to immerse variable areas of said second electrode in said liquid, to thereby vary the capacitance between said electrodes.

References Cited in the file of this patent

UNITED STATES PATENTS

| | | |
|---|---|---|
| 918,257 | Babcock | Apr. 13, 1909 |
| 995,728 | Sloan | June 20, 1911 |
| 2,575,726 | Peck | Nov. 20, 1951 |
| 2,691,223 | Oberlin | Oct. 12, 1954 |

FOREIGN PATENTS

| | | |
|---|---|---|
| 301,508 | Germany | Feb. 2, 1917 |
| 648,583 | Great Britain | Jan. 10, 1951 |
| 1,056,401 | France | Oct. 21, 1953 |